United States Patent [19]

Matkan

[11] 4,176,406

[45] Nov. 27, 1979

[54] INFORMATION RECORDING AND RECOGNITION

[75] Inventor: Josef Matkan, Adelaide, Australia

[73] Assignee: Moore Business Forms, Inc., Niagara Falls, N.Y.

[21] Appl. No.: 847,558

[22] Filed: Nov. 1, 1977

[30] Foreign Application Priority Data

Nov. 5, 1976 [AU] Australia ............................ PC8021

[51] Int. Cl.² .................... G11C 11/42; G11C 11/26
[52] U.S. Cl. ................. 365/148; 179/100.1 B; 235/441
[58] Field of Search ............ 346/165, 159; 250/324, 250/325; 365/148, 244; 179/100.1 B; 235/441, 492

[56] References Cited

U.S. PATENT DOCUMENTS

| | | | |
|---|---|---|---|
| 3,194,674 | 7/1965 | Sakurai | 346/153 |
| 3,358,289 | 12/1967 | Lee | 179/100.1 B |
| 3,573,845 | 4/1971 | Gourdine | 179/100.1 B |
| 3,765,027 | 10/1973 | Bresnick | 346/159 |
| 3,890,621 | 6/1975 | Cantarano | 346/159 |
| 3,900,852 | 8/1975 | Raschke | 346/159 |
| 3,986,189 | 10/1976 | Van Biesen et al. | 346/159 |
| 4,002,527 | 5/1977 | Jackson | 346/159 |
| 4,077,051 | 2/1978 | Vossen | 179/100.1 B |

Primary Examiner—Terrell W. Fears
Attorney, Agent, or Firm—Kinzer, Plyer, Dorn & McEachran

[57] ABSTRACT

A method of information recording and recognition comprising printing on one surface of a recording member information in the form of ink deposits having electrical conductivity measurable different from that of the non-printed background areas, passing the recording member through an information recognition zone containing corona generating means and sensor means, directing ionic emission from corona generating means towards one face of said recording member, and detecting on the sensor ionization and ion emission changes effected by electrical conductivity differences between said printed ink deposits and non-printed background areas, and converting the thus detected ionization and ion emission changes into electrical signal corresponding to the information.

12 Claims, 4 Drawing Figures

INFORMATION RECORDING AND RECOGNITION

BACKGROUND OF THE INVENTION

Non-impact printing methods are known in which visual information is printed on moving paper webs or other materials as desired using a device which directs coloring matter towards the web surface under the influence of electrical signal control circuitry. Non-impact printing devices include the well known so-called jet printers, such as disclosed in U.S. Pat. Nos. 3,060,429 of C. R. Winston, 3,577,198 of D. R. Beam, 3,416,153 of C. H. Hertz et al, 3,562,757 of V. E. Bischoff, 3,769,624 of C. H. Lee et al, 3,769,627 of J. J. Stone and others. In addition electrokinetic methods are known in which the printing head is positioned in virtual contact with the web surface, such as is disclosed in U.S. Pat. No. 3,750,564 of H. Bettin.

The jet printing mechanisms disclosed in the aforementioned U.S. patents generally disclose the generation of a stream of ink droplets at least portion of which are electrostatically charged. Signal controlled deflector means are used to cause droplets to contact the moving web surface whereas droplets not forming part of the information are prevented from contacting the said surface by the use of a catcher or the like from which the unused droplets of ink are returned to the reservoir. The disclosure of Bettin in U.S. Pat. No. 3,750,564 and J. P. Arndt in U.S. Pat. No. 3,832,579 each reveal non-impact printing methods in which a signal is employed to form droplets of finite quantity of recording material without the need for return of excess ink to the system reservoir.

Generally prior art non-impact printing methods produce visible printed deposits on moving webs such as paper at high speed. Such systems are generally of limited resolution and produce printed deposits of relatively low density which consequently are normally inadequate for subsequent recognition by for instance Optical Character Recognition or Magnetic Image Character Recognition means for further information processing, as is readily attainable with information printed by contact processes such as lithography, letterpress and the like.

SUMMARY OF THE INVENTION

In accordance with this invention information is recorded for instance by printing on a recording member such as paper web in the form of an ink deposit. Printing may be carried out by non-impact means, contact printing processes such as lithography, letterpress and the like, or impact printing processes such as typing and the like. The ink deposit comprising the information is characterized by having a measurably different electrical conductivity to that of the non-printed background areas of the recording member. Such difference in electrical conductivity is monitored for recognition by sensor means and converted to an electrical signal corresponding to the printed information. The electrical signal forms a readout which can be used for further information processing such as required in process control for instance for sorting or classification, or for identification, verification and other like purposes.

The ink deposit on the recording member can be advantageously used for security printing as it need not be visually apparent, thus allowing the printed information to be relatively tamper proof at least with regards substitution thereof.

The means in accordance with this invention for recognizing the conductivity difference between the ink deposits comprising the printed information and the non-printed background areas of the recording member consists of a corona generator which emits corona directed towards the recording member containing the printed information thereon and voltage or electrostatic charge density or ionization or current sensitive detector means positioned so as to detect differences in corona scatter or in corona emission or in ionization or in electrostatic surface charge acceptance or in corona current caused by the presence of the ink deposits on the recording member when in the information recognition zone.

DESCRIPTION OF THE DRAWINGS

In the following detailed description of the invention reference is made to the accompanying drawings, in which.

DETAILED DESCRIPTION OF THE INVENTION

Figure 1:
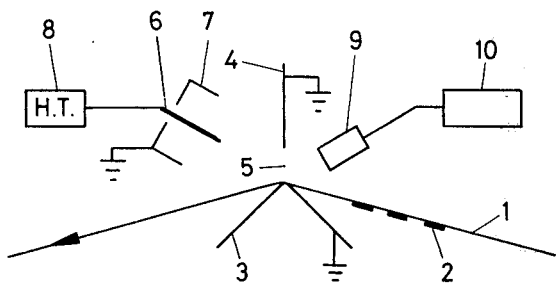
FIG. 1 illustrates a first embodiment of the invention in which for information recognition a sensor detects corona scatter or ionization changes caused by the printed ink deposit on the recording member as it passes through a gap between two grounded members.

Referring now to FIG. 1 in detail, a recording member such as paper web 1 having printed ink deposit 2 on the lower side thereof moves in the direction shown in contact with curved grounded member 3. Grounded shield 4 is mounted as shown above curved grounded member 3 forming a gap 5 through which paper web 1 moves. Corona generator 6, mounted preferably but not necessarily in grounded shield 7 and excited by high voltage power supply 8 is mounted as shown above paper web 1 facing the gap 5 between curved grounded member 3 and grounded shield 4. Sensor 9, which may be the detector probe of an electrostatic voltmeter or other ionization sensitive instrument, is mounted as shown facing gap 5 on the opposite side of grounded shield 4 to that of corona generator 6. For information recognition sensor 9 detects differences in corona scatter or ionization changes which occur when printed ink deposit 2 on paper web 1 enters the information recognition zone that is to say when it contacts curved grounded member 3, said printed ink deposit 2 and the non-printed background areas of said paper web 1 being of measurably different electrical conductivity. The output from sensor 9 can be fed into circuitry 10 for further processing of the thus recognized information.

In this first embodiment the positioning of the corona generator 6 in relation to sensor 9, curved grounded member 3 and grounded shield 4 is determined in conjunction with the selection of appropriate voltage and polarity for corona emission by the physical properties and characteristic conductivity of the recording member 1 and of the conductivity difference existing between the non-printed background areas of such recording member 1 and that of the printed ink deposits 2 thereon in order to obtain the desired signal to noise ratio in the output of the circuitry associated with sensor 9 at the required processing speed. As noise level is defined here the output from sensor 9 when non-printed background areas of recording member 1 are passing through the information recognition zone whereas as signal level is defined the output from sensor 9 when printed ink deposits 2 on recording member 1 are passing through the information recognition zone.

Whilst in FIG. 1 the information recognition zone is formed over a curved grounded member 3, such grounded member need not be shaped as shown in the drawing, and can be substituted by grounded members of other form, such as a roller, knife edge, plate or the like.

Grounded shield 4 in FIG. 1 serves the purpose of preventing direct interference of corona emission from corona generator 6 on sensor 9. Grounded shield 4 can be in the form of a knife edge, or shields of other shapes can be used and positioned to form gap 5 just sufficient for the passage of recording member 1 therethrough.

Figure 2:
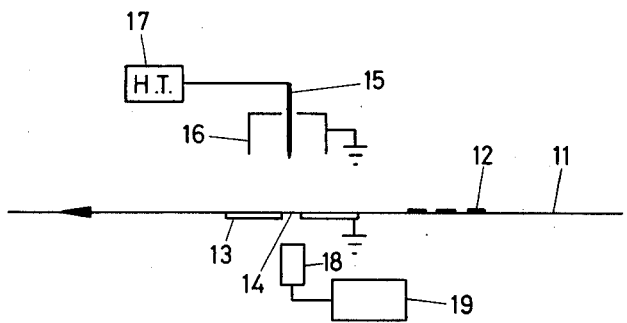
FIG. 2 illustrates a second embodiment of the invention in which a sensor detects changes in corona emission or ionization caused by the printed ink deposit on the recording member as it passes over an aperture in a grounded shield member.

Referring now to FIG. 2 in detail, a recording member such as a paper web 11 having printing ink deposit 12 on the upper side thereof moves in the direction shown with its lower side in contact with grounded member 13 containing aperture 14. Corona generator 15, preferably but not necessarily mounted in grounded shield 16 is excited by high voltage power supply 17 and is positioned above paper web 11 facing aperture 14 in grounded member 13. Sensor 18, which may be the probe of an electrostatic voltmeter or other ionization sensitive instrument is mounted below said grounded member 13 and facing said aperture 14 forming the information recognition zone to detect changes in the corona emission or ionization caused by the presence or absence of the printed ink deposit 12 over the aperture 14 where such changes in the corona emission or ionization are caused by measurable electrical conductivity difference between said printed ink deposit 12 and the non-printed background areas of said paper web 11.

The output from sensor 18 can be fed into circuitry 19 for further processing of the thus recognized information.

Aperture 14 may have a round shape or may be in the form of a slot, and the shape and size of such aperture 14 in conjunction with the size, shape and thickness of grounded member 13 are determined mainly by the resolution requirements for correct information recognition at the required processing speed.

Figure 3:
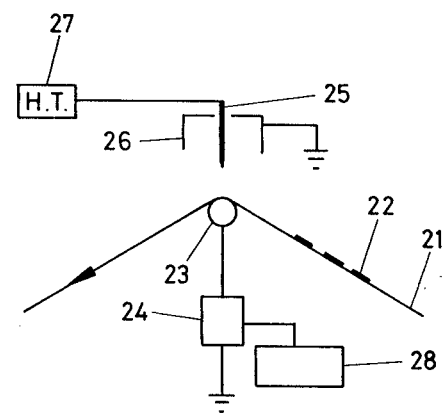
FIG. 3 illustrates a third embodiment of the invention in which the detector circuitry measures corona current changes induced by the presence of the printed ink deposits on the recording member as it passes over a conductive member.

Referring now to FIG. 3 in detail, a recording member such as a paper web 21 having printed ink deposit 22 on the upper side thereof moves in the direction shown with its lower side in contact with roller 23. Roller 23 is grounded through current measuring device 24. Corona generator 25 mounted preferably but not necessarily in grounded shield 26 is excited by high voltage power supply 27 and is positioned above paper web 21 facing roller 23. Current measuring device 24 detects for information recognition changes in the corona current caused by the presence or absence of printed ink deposit 22 between roller 23 and corona generator 25. The output from current measuring device 24 can be fed into circuitry 28 for further processing of the thus recognised information.

The diameter of roller 23 in conjunction with the width of gap between same and corona generator 25, and applied corona voltage are determined by the resolution requirements for correct information recognition at the required processing speed.

Figure 4:
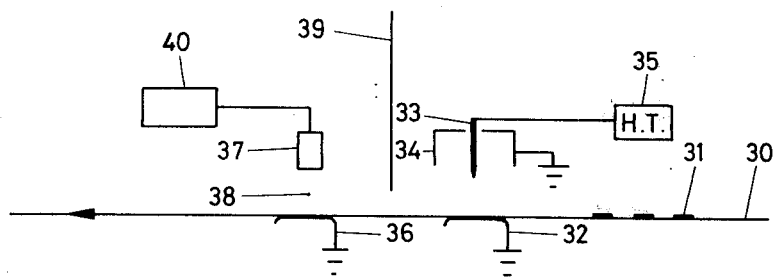
FIG. 4 illustrates a fourth embodiment of the invention in which a sensor detects electrostatic surface charge differences caused by the presence of printed ink deposits on the recording member after it passes beneath the corona generator.

Referring now to FIG. 4 in detail, a recording member such as paper web 30 having printed ink deposit 31 on the upper side thereof moves in the direction shown in contact with grounded member 32. Corona generator 33, mounted preferably but not necessarily in grounded shield 34 and excited by high voltage power supply 35 is positioned above paper web 30 facing grounded member 32. Paper web 30 subsequently passes over and in contact with grounded member 36. Sensor 37 which may be the detector probe of an electrostatic voltmeter or other ionization sensitive instrument is mounted as shown above paper web 30 and faces grounded member 36, gap 38 between grounded member 36 and sensor 37 forming the information recognition zone. Shield member 39 is positioned as shown to prevent direct interference between corona generator 33 and sensor 37, and may be grounded if so desired. For information recognition sensor 37 detects differences in electrostatic surface charges accepted by the non-printed background area of web 30 and the printed ink deposits 31 contained thereon as said web 30 passes through said information recognition zone in gap 38. The output from sensor 37 can be fed into circuitry 40 for further processing of the thus recognized information.

Printed ink deposits for the purpose of this invention may be polar or non-polar as desired, the choice of such deposit type depending on the nature of the recording member and recognition means employed. Thus in those instances in which the recording member is relatively conducting it is preferable to employ non-polar materials in the printed ink deposit. In those instances in which the recording member is relatively insulating it is preferable to employ polar materials in the printed ink deposit. Most paper may be considered to be of intermediate conductivity to which either polar or non-polar printed ink deposits may be applied for the purpose of this invention.

Non-impact printing methods of the type previously described such as for instance jet printing have been used to form printed ink deposits of each type, that is to say polar and non-polar, on moving webs at web speeds of the order of 800 ft./minute. Depending on the choice of material contained within the ink such printed deposits may be very sharply defined, thereby inducing sharply defined and readily detectable local variations in the conductivity as determined by the volume or surface resistivity of the printed web in relation to the ink deposits which comprise the printed information. Contact and impact printing methods of the type previously described are equally applicable to the present invention to form printed ink deposits of each of the polar and non-polar types previously defined.

Various chemical types of polar or electrically conductive materials have been found to be adaptable to the present invention and capable of producing the necessary conductivity differences on recording members printed therewith. Such printed ink deposits are of higher electrical conductivity than the non-printed background areas of such printed recording members. Such materials are of the groups defined as electroconductive polymers, amines, surface active agents, fatty acids, and hygroscopic salts. Of these groups electroconductive polymers, reactive polyamide and surface active agents which are solid at ambient temperatures are of most interest as they provide materials capable of forming printed deposits which are permanent, visually inconspicuous and capable of at least partial absorption into recording materials such as paper whereby removal of such printed ink deposits is rendered difficult.

Electroconductive polymers which have been found particularly useful include I.C.I. Calofac ECA, Dow Corning ECR 34 and Calgon Corporation Polymer 261. These materials are polymeric quarternary ammonium and other electroconductive types such as are disclosed in U.S. Pat. Nos. 3,011,918 and 3,544,318. Such electroconductive polymers are water soluble and may be printed on recording members such as paper using a jet printer or other non-impact printer when dissolved in water at concentrations up to at least 5% solids which is more than adequate for the purpose of the present invention. Contact printing methods such as for instance flexography are equally suited to the printing of ink deposits containing such electroconductive polymers for the purpose of this invention.

Surface active agents may also be employed advantageously for the purposes of the present invention to produce conductive printed ink deposits. Such surface active agents may be anionic or cationic as desired but should preferably be solid at ambient temperatures to allow such printed ink deposits to be relatively permanent. Conversely short term security printing may be carried out using ionic surface active agents which are volatile to some extent whereby the detectable printed ink deposit disappears with time. Solid surface active agents usable for the purpose of the present invention include the anionic materials dodecylbenzenesulfonic acid sodium salt and sodium dodecyl sulfate and the cationic material di-iso-butyl phenoxyethoxy dimethyl benzyl ammonium chloride monohydrate.

Reactive polyamides have also been found effective for the purpose of the present invention for forming polar printed ink deposits. Generally polyamides with an amine number within the range 230–450 have been found effective. Such reactive polyamides are generally not water soluble but can be dissolved in alcohols such as ethanol and isopropanol to form solutions containing up to at least 5% solids to obtain suitable viscosity for jet printing or flexographic application.

Non-polar that is to say insulating materials may also be employed to form printed ink deposits for the purpose of this invention. In such instances the printed ink deposit is generally of greater electrical resistivity than the non-printed background areas of the recording member. Suitable non-polar materials for the purpose of this invention are polyvinyl butyral, polystyrene, polyester resins, epoxy ester resins, alkyd resins, acrylic resins and the like. The printing method used is to some extent dependent on the material chosen to form the printed ink deposit, for instance polyvinyl butyral, polystyrene, acrylic resins and linear polyester resins, when dissolved in an appropriate solvent, may be printed down using jet printing or flexographic methods, whereas epoxy ester resins, alkyd resins and the like are more suited to application using letterpress and offset printing methods. Insulating waxes, such as microcrystalline wax, may be printed down using impact means such as typing or the like.

Each of the recognition means illustrated in FIGS. 1, 2 and 3 is suitable for the sensing of conductivity difference when the recording member is a paper web and the printed ink deposits are either polar or non-polar. In those instances where the resistivity of either the non-polar ink deposit on the recording member or of the recording member containing polar printed ink deposits thereon is sufficiently high so as to support an electrostatic charge, the recognition means illustrated in FIG. 4 can be employed.

It has been found that each of the three embodiments described and illustrated in FIGS. 1, 2 and 3 is capable of sensing very small quantities of printed polar material in the form of printed ink deposits. For example deposits of the electroconductive polymer Calofax ECA which is a proprietary product of ICI and deposits of electroconductive polymers of the quaternary ammonium type were jet printed on a moving paper web recording member at a printing speed of 800 ft./minute using water solutions of such electroconductive polymer containing 40%, 4%, 2%, 1% and 0.4% polymer, respectively. The means of each of these three embodiments sensed all printed deposits. Surprisingly the embodiment illustrated in FIG. 2 was found to be relatively independent of polymer concentration in the jet printing ink while each of embodiment 1 and embodiment 3 exhibited concentration sensitivity. Signal to noise ratios of 10:1 are readily achieved on a recording member comprising journal tape paper with the means of FIG. 2 whereas signal to noise ratios with each of the means of FIG. 1 and FIG. 3 vary between 3:1 and 8:1, depending on the concentration and/or conductivity of the polar material in the ink deposit.

Sensing of non-polar or insulating printed ink deposits on recording members such as paper has also been found possible using each of embodiments 1, 2 and 3, and in addition embodiment 4 has been found particularly suited to sensing of insulating printed ink deposits. For example 5% solutions in appropriate solvents were prepared using each of the non-polar materials polyvinyl butyral, polystyrene and a linear polyester resin, to form inks which were jet printed on to a recording member comprising a paper web at a printing speed of 800 ft./minute to form an insulating printing ink deposit thereon. Polyvinyl butyral and polystyrene printed as previously described and dried on the recording member surface were each found to produce printed ink deposits readily suited to sensing by means of each of embodiments 1, 2, 3 and 4. Linear polyester printed ink deposits as previously described were found to be less readily adapted to sensing with embodiment 1, but readily suited to sensing with the means of embodiments 2, 3 and 4. Embodiment 4 was found to be the most suitable recognition means for use in conjunction with such non-polar or insulating printed ink deposits formed on paper recording members, in each instance the signal to noise ratio was in excess of 20:1, whereas the signal to noise ratio in embodiments 1, 2 and 3 varied between 3:1 and 15:1.

It will be realised that although for the purpose of this invention the printed ink deposit is not required to be visible for information recognition, provided the conductivity difference is maintained between the printed ink deposits and the non printed areas of the recording member it is possible to incorporate coloring matter into the ink or by appropriate formulation incorporate polar or insulating material into printing inks to render same recognisable by the method and means of this invention.

There has been described a novel method of and means for information recording and recognition at high speeds, such information being recorded in a form useful for sorting, classifying, identification and verification. Materials usable for the purpose of the invention have been disclosed. Four recognition means have been illustrated and described. It will be realised that the disclosure teaches a novel technology, and that the principles disclosed herein are applicable to printing methods, materials and sensing means additional to those specifically disclosed. Accordingly the materials, methods and means disclosed should be considered as illustrative only and not construed as limiting the scope of this invention.

I claim:

1. A method of information recording and recognition comprising the steps of printing on one surface of a recording member information in the form of ink deposits where such ink deposits contain a substance capable of conferring to such ink deposits electrical conductivity measurable different from that of the non-printed background areas of said recording member, passing said recording member through an information recognition zone, positioning corona generating means adjacent said information recognition zone and directing the ionic emission from said corona generating means towards one face of said recording member, positioning sensor means in said information recognition zone to detect ionization and ion emission changes effected by electrical conductivity differences between said printed ink deposits and non-printed background areas on said recording member and converting the thus detected ionization and ion emission changes into an electrical signal corresponding to said information.

2. A method of information recording and recognition as disclosed in claim 1 characterized by printing said information in the form of ink deposits containing a substance capable of conferring to such ink deposits higher electrical conductivity than that of said non-printed background areas of said recording member.

3. A method of information recording and recognition as disclosed in claim 1 characterized by printing said information in the form of ink deposits containing a substance capable of conferring to such ink deposits lower electrical conductivity than that of said non-printed background areas of said recording member.

4. A method of information recording and recognition as disclosed in claim 1 wherein said ionization and ion emission changes are detected in the form of changes in the density of electrostatic charges.

5. A method of information recording and recognition as disclosed in claim 1 wherein said ionization and ion emission changes are detected in the form of changes in corona current.

6. A method of information recording and recognition as disclosed in claim 2 wherein said ink deposits contain a polar substance selected from the group electroconductive polymers, amines, surface active agents, fatty acids and hygroscopic salts.

7. A method of information recording and recognition as disclosed in claim 3 wherein said ink deposits contain a non-polar substance selected from the group polyvinyl butyral, polystyrene, polyester resins, epoxy ester resins, alkyd resins, acrylic resins and insulating waxes.

8. A method of information recording and recognition as disclosed in claim 1 wherein said ink deposits are formed on said recording member by jet printing.

9. A method of information recording and recognition as disclosed in claim 1 wherein said ink deposits are formed on said recording member by lithographic printing.

10. A method of information recording and recognition as disclosed in claim 1 wherein said ink deposits are formed on said recording member by flexographic printing.

11. A method of information recording and recognition as disclosed in claim 1 wherein said ink deposits are formed on said recording member by letterpress printing.

12. A method of information recording and recognition as disclosed in claim 1 wherein said ink deposits are formed on said recording member by impact printing.

* * * * *